Feb. 25, 1958 F. MACHALEK 2,824,383
APPARATUS AND METHOD FOR ELECTRICALLY
HEATING WET POROUS SHEETS
Filed April 17, 1952 3 Sheets-Sheet 1
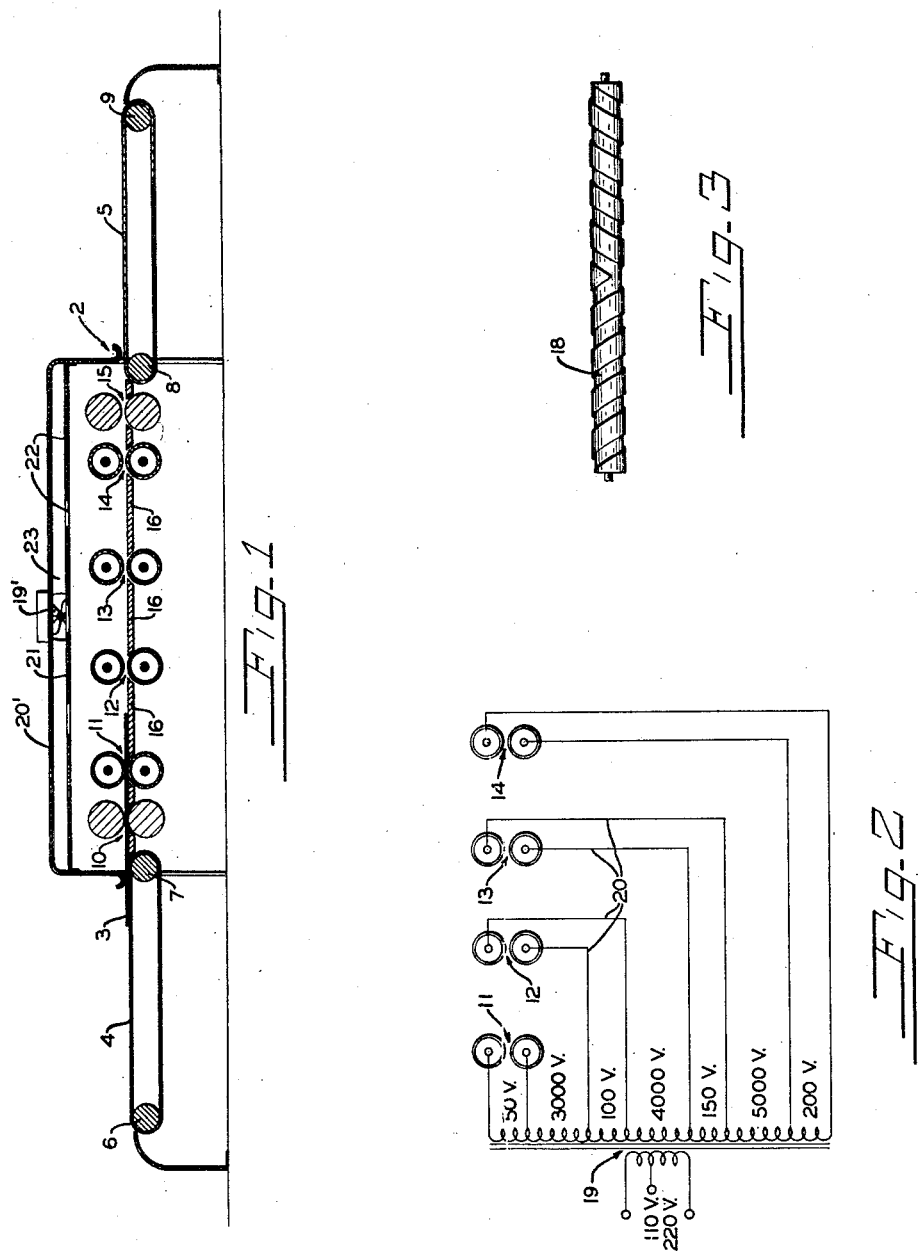
INVENTOR.
FERDINAND MACHALEK
BY
DES JARDINS, ROBINSON & KEISER
Albert F. Robinson
HIS ATTORNEYS

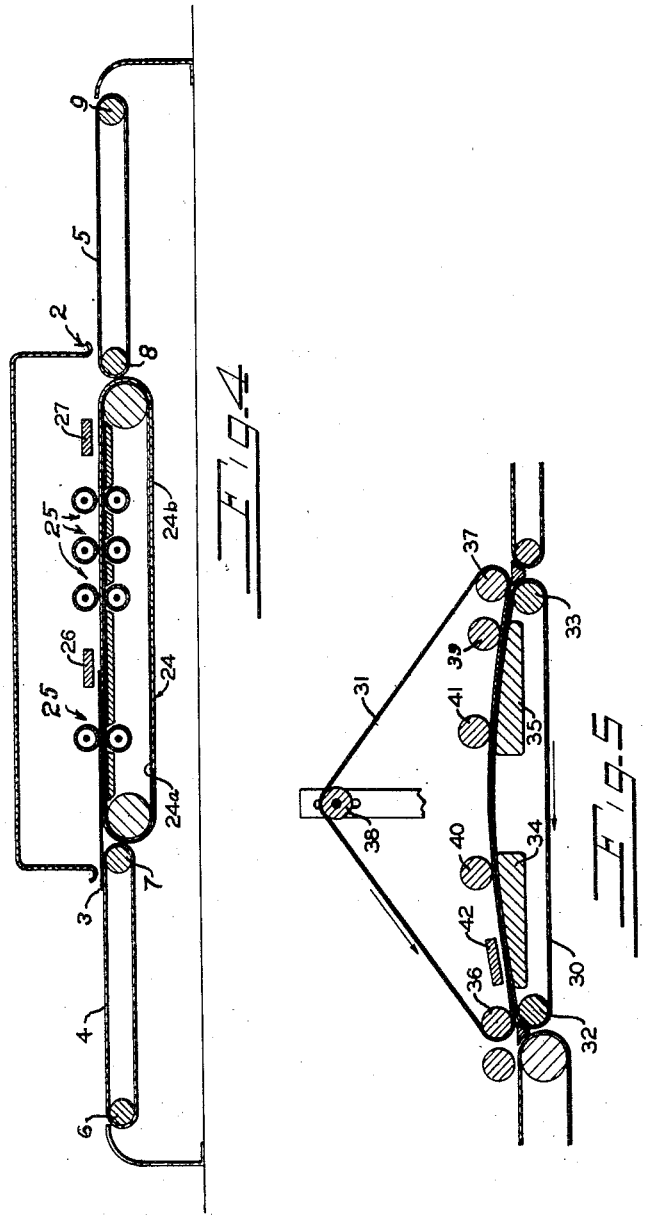

Feb. 25, 1958

F. MACHALEK 2,824,383

APPARATUS AND METHOD FOR ELECTRICALLY
HEATING WET POROUS SHEETS

Filed April 17, 1952

INVENTOR.
FERDINAND MACHALEK
BY
DES JARDINS, ROBINSON & KEISER

HIS ATTORNEYS

United States Patent Office 2,824,383
Patented Feb. 25, 1958

2,824,383

APPARATUS AND METHOD FOR ELECTRICALLY HEATING WET POROUS SHEETS

Ferdinand Machalek, Cincinnati, Ohio, assignor of one-third to Joseph Dvorak, and one-third to Joseph Litochleb, Cincinnati, Ohio Application April 17, 1952, Serial No. 282,863

11 Claims. (Cl. 34—1)

This invention relates to apparatus and method for electrically heating wet porous articles, such as leather, fabric, paper, wood and the like, and it particularly pertains to electrically heating said articles to a regulated degree of dryness automatically controlled by the moisture content of the articles and with the moisture carried by said articles serving to make effective contact with the electrodes that are disposed in contact with opposite surfaces of the articles for completing an electrical circuit.

Direct or alternating electric current may be employed for the electrical heating. With the use of direct electric current regulation is by the resistance or the voltage, whereas with alternating current regulation is by a transformer controlled by a voltmeter. Electrodes are brought into contact with the opposite surfaces of the articles, and effective electrical circuit between said electrodes and through the articles is maintained by the moisture content of said articles. When the articles are freed of their moisture, or any regulated amount thereof, the electrical circuit is thereby broken or opened. Accordingly, the articles can be uniformly dried to any regulated degree of dryness, and the degree of dryness regulated by the moisture content of the articles being dried.

Wet porous articles have much more of their moisture content contained within and throughout the interior of their bodies than on their exposed surfaces, it being contained in the cells of the fibers and the interspaces therebetween. The articles are not dried until the moisture content therein is forced from the interior to the surface where it is evaporated. Accordingly, drying processes have been slow, and those previously employed do not dry the articles uniformly, there being no relation between the current applied for supplying the heat and the moisture content of the articles. Electric drying as heretofore employed has not been applied so as to effect uniform resistance throughout the bodies of the articles being dried, and, as a result, they have been dried irregularly and non-uniformly. Frequently it has been necessary to treat the dried articles to uniformly disperse the moisture content through the dried articles so that some parts thereof would not be drier than other parts.

Accordingly, one of the principal objects of the present invention is apparatus and method for effecting speedy and uniform drying of porous articles.

Another object of the invention is apparatus and method which are simple and efficient in operation.

Another object of the invention is apparatus and method for effectively drying the objects uniformly throughout their thickness.

Another object of the invention is apparatus and method in which the heating of the objects is automatically regulated and controlled by their moisture content.

Still another object of the invention is to provide a plurality of low voltage circuits in one direction of the article, at spaced intervals along the opposite direction, to provide drying areas between the heat applied areas.

Still another object of the invention is in the establishment of electrical contact between the electrodes on opposite faces of the articles by the moisture content of said articles.

Further objects, and objects relating to details of construction and economies of operation, will readily appear from the detailed description to follow. I have accomplished the objects of my invention by the devices and means set forth in the following specification. My invention is clearly defined and pointed out in the appended claims. Structures constituting preferred embodiments of my invention are illustrated in the accompanying drawings, forming part of this specification, in which:

Fig. 1 is a longitudinal sectional view of a machine embodying one embodiment of my invention.

Fig. 2 is a diagrammatic view of a series of roll pairs connected with a transformer.

Fig. 3 is a detailed view of a portion of one of the upper rolls of a roll pair.

Fig. 4 is a longitudinal sectional view of another embodiment of the invention.

Fig. 5 is a longitudinal sectional view of still another embodiment of the invention.

The invention generally described comprises rolls or electrodes vertically spaced for the wet articles to be placed therebetween with the rolls or electrodes in contact with the opposite surfaces of said articles. Alternating electrical current is employed, and the rolls or electrodes are connected to a transformer. Transversely of the articles, at spaced intervals longitudinally, a low voltage circuit is provided. This provides for effective heating without too rapid heating and at too high temperatures. These electrodes may be in the form of plates or rollers. Liquid, carried by the wet articles, is provided between the rolls or electrodes and the wet articles to insure an effective electrical circuit when said articles are wet. The liquid carried by the articles is quickly heated, and, as its temperature is raised, it is forced out of the body of the articles to their opposite surfaces to be evaporated in the surrounding atmosphere. A series of low voltage heating areas are disposed transversely and spaced apart longitudinally to provide intervening drying areas between the heating areas.

There may be forced circulation of the surrounding atmosphere by a blower or exhaust fan or fans to increase the evaporation of the liquid from the surface of the articles. The liquid forced from the articles insures good contact between the rolls or electrodes and the opposite surfaces of the sheet so that the electrical circuit is maintained until the articles are dried to the desired degree, at which time the electrical circuit is broken by absence of sufficient moisture to complete the electrical circuit. Ordinarily, the articles are dried to have from 5 to 10 percent water content of that of the surrounding atmosphere.

Figure 6:
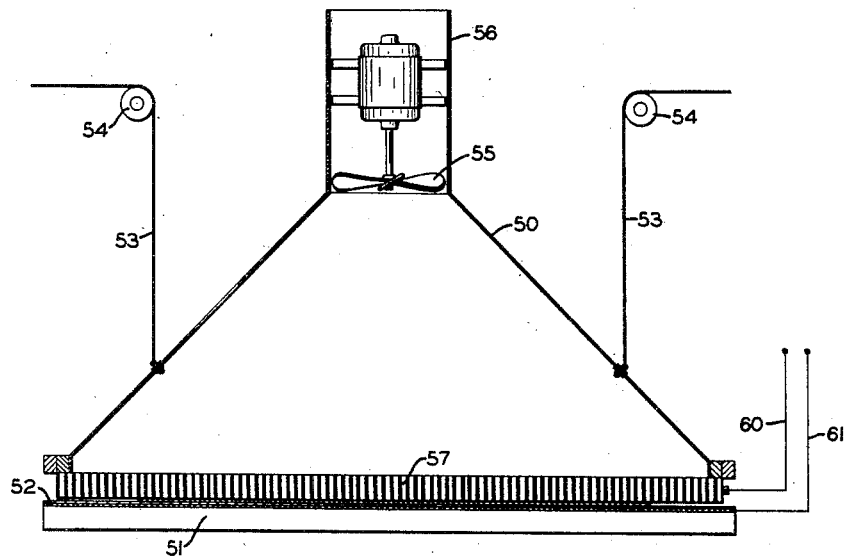
Fig. 6 is a longitudinal sectional view of still another embodiment of the invention.

There may be a high voltage circuit disposed between the low voltage heating areas to also heat the articles between the low voltage heating areas. The voltage in the low voltage areas may be the same, or it may be progressively increased so that more heat is applied progressively as the articles are dried. This can be done where the articles are being moved as they are being dried. The device in Fig. 6 is for batch drying or when the article is held stationary, whereas the other devices are continuous and uninterrupted operation.

Referring specifically to the drawing in which like numerals are used to designate like parts, numeral 2 designates generally a drying apparatus (Fig. 1) to which the web articles 3 are fed on an endless conveyor 4 at one end of the drying apparatus to be discharged there-from in dried condition at the opposite end on a take-off endless conveyor 5.

The feed conveyor 4 is threaded over horizontally spaced rollers 6 and 7, either or both of which may be driven by any suitable driving means. Likewise the take-off conveyor 5 is threaded over horizontally spaced rollers 8 and 9, either or both of which may be driven by any suitable driving mechanism. It will, of course, be understood that the rollers for these conveyors will be journaled on suitable supporting means and disposed at a convenient working elevation.

Disposed between the two endless conveyors 4 and 5 are a series of roll pairs 10, 11, 12, 13, 14, 15, the rolls of each pair being vertically spaced apart in position to contact with the opposite surfaces of the articles 3 which are fed between the roll pairs. The bottom rolls of each of the roll pairs are fixed in position with their top peripheries in horizontal alignment with the conveyors 4 and 5. Supporting means in the form of plates 16 may be interposed between the bottom rolls of the roll pairs to bridge over the spaces therebetween. These plates 16 typify any supporting means or bridging means which could be rollers, screens or the like.

The intervening roll pairs 11, 12, 13 and 14 are connected to alternating or direct electrical current, a transformer being used if the current is alternating. The end roll pairs 10 and 15 are not connected in the electrical circuit and are preferably used as guard rolls. They may be surfaced with non-conductive material, and preferably grounded to assure no electrical circuit through the articles except as provided by intervening roll pairs.

The intervening roll pairs may be plain surfaced or covered with absorbent materials, such as fabric, screening, netting or the like. A wire brush is particularly suitable as it provides for good contact and gives a much larger surface area over which the moisture can be collected as it is driven from the interior of the articles. Consequently, it provides for better evaporation of the moisture. The peripheries of any or all of these intervening roll pairs may be surfaced with the wire brush.

In order to stretch the articles being dried or to prevent them from shrinking, the follower rolls may be rotated at gradually increased speeds. For example, with the articles being fed through the drier from left to right, the roll pair 15 can be rotated slightly faster than roll pair 14. Roll pair 14 is driven slightly faster than roll pair 13, and so on in respect to the other roll pairs. This will stretch the articles longitudinally between the adjacent roll pairs as they are fed through the drier.

In order to provide for transverse spreading or stretching, the periphery of some of the rolls may be provided with oppositely disposed spiral grooves 18 (Fig. 3), extending from the transverse middle of the rolls toward their opposite ends. These oppositely disposed grooves will exert a wiping action transversely away from the longitudinal center line of the drier towards its sides, thereby spreading or stretching the articles transversely. This is especially desirable in respect to drying leather which has a tendency to shrink as it is dried.

The rolls of each intervening roll pair are connected in series to a transformer 19 by wiring 20. There is a low voltage circuit of about 50 to 200 volts between the rolls of each pair. A high voltage circuit can also be provided between each roll pair of the series. This high voltage may be from 3,000 to 5,000 volts or more. The voltage in the low voltage circuit between rolls of each roll pair may be the same or different as desired, and this is also true as to the high voltage between the different roll pairs. This is preferably increased as the articles are dried.

It will be apparent that there will be a low voltage circuit transversely of the articles to be dried by reason of the contact of the rolls of each pair with the articles 3, whereas between the adjacent roll pairs there will be a high voltage circuit. The ohmic resistance is least where there is the greatest amount of water, and, accordingly, it will be least transversely of the articles rather than through the body of the articles between the roll pairs by reason of the moisture being driven out upon the surface of the articles. The liquid contained in the articles is heated and driven from the body to the opposite surfaces so as to be evaporated by the surrounding atmosphere circulated through the drier.

During the drying process, the greatest amount of liquid will be upon the opposite surface of the articles between them and the rolls, and, therefore, the ohmic resistance will, accordingly, be less transversely of the articles. However, the presence of the liquid transversely upon the opposite faces insures electrical contact between the rolls and the articles so long as any liquid is there present. When no liquid is present, the electrical circuit is opened and shut off, and there is no further drying. Accordingly, the degree of the drying thus effectively and automatically is regulated by the moisture content of the articles. This also assures their uniform drying.

In order to accelerate the drying of the liquid from the surface of the articles and from the peripheries of the rolls as it is forced from the article by electric heating, an exhaust or blower fan 19' may be disposed in any suitable place for circulating the air through the drier beneath the hood or cover 20' over the rolls. There is a sub-hood 21, perforated at 22, to provide a passage or conduit 23 through which air may be circulated by the blower.

Frequently it is desired to emboss the articles being dried, particularly in the case of leather, with a decorative appearance, and a top roll of one of the roll pairs near the end of the drying operation may be embossed with a suitable embossing design. The articles are preferably embossed at some intermediate stage of the drying process rather than after the drying is completed in order for the embossing to be more permanent. By embossing before the articles are completely dried, the embossment will be set and made permanent by the drying.

The embodiment in Fig. 4 is in principle much like that of Fig. 1 except that the endless conveyor 24 is threaded over the roll pairs 25 which are connected to the transformer and serve as a feeding means to and through the drier. The conveyor has a metal core 24a with a fabric or porous covering 24b. One or more bars or plates 26 and 27 are disposed between the roll pairs in spaced relation to the top surface of the articles to be dried to provide for dielectric heating as an adjunct to the previously described electric heating by conductive electric current. These bars or plates may be connected to a separate high frequency electrical circuit. The conveyor 24 in this embodiment comprises, as stated above, metal core 24a with a non-metal covering 24b, such as fabric, porous material or the like. The conveyor having the metal core can be connected in electrical circuit with the upper rolls of the intermediate roll pairs and the plates in lieu of the bottom rolls of the roll pairs in Fig. 1. The porous covering for the metal core of the conveyor permits even better control of the drying of the articles to a desired degree. As the non-metallic cover of the conveyor is dried from lack of moisture from the articles, it too will serve to break or open the electrical circuit when the articles are dried to the desired degree.

In this embodiment the voltage between each of the roll pairs may be the same or different. Since the articles being dried are in contact with the belt over their entire area, they will be heated throughout their entire area rather than only across the transverse lines where the articles are in contact with the upper rollers. Accordingly, between the top rolls of the adjacent roll pairs, the voltage may be the same or different. For example, between the first and second top rolls, there may be a 200 volt circuit, between the second and third top rolls a 300 volt circuit, and so on progressively.

The embodiment of Fig. 5 has the drier between the feed and take-off conveyors in the form of adjacent endless conveyors 30 and 31. The lower conveyor is threaded over rollers 32 and 33. Electrodes 34 and 35 are disposed between the ends of the conveyor beneath its upper loop for said loop to traverse thereover adjacent the upper conveyor 31. The upper conveyor 31 is disposed over rollers 36, 37 and 38, the latter top roller 38 being adjustable, by any suitable means, for tensioning the conveyor. There may also be idler rollers 39, 40 and 41, these being connected to an electric circuit as above described, as are the electrodes 34 and 35. There will be a low voltage circuit between the electrodes and the electrically charged rollers. The chief feature of this embodiment of Fig. 5 is the arched path between the conveyors so that there will be no tendency for the articles to wrinkle in being fed through the drier, their movement through this arched path keeping them stretched. Then, too, the electrodes 34 and 35 not being rotatable but stationary will produce an ironing effect to smooth out and stretch the article or articles being dried.

An electrode 42 may also be disposed in spaced relation from the articles being fed between the conveyors for providing dielectric heat as an adjunct to the thermoelectric heating as above described in connection with Fig. 4.

Figure 7:
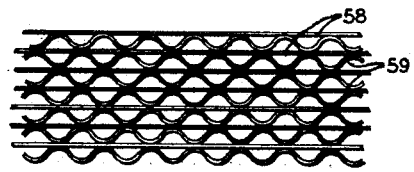
Fig. 7 is a top view of a portion of the screen member in Fig. 6.

In the embodiment of Fig. 6 the drier is in the form of a ventilated hood 50 which is vertically adjustable in respect to a metal table or support 51 surfaced with a layer of non-metal material 52. The hood can be raised or lowered in respect to the table or support by any suitable means, such as pull cords 53 over the pulleys 54. An exhaust fan 55 is disposed in the flue 56 of the hood for carrying away the steam vapor accumulating in the drier beneath the hood. The bottom of the hood is provided with a non-flexible metal screen 57 of any suitable construction. It is typified by flat strips 58 disposed between corrugated metal strips 59 (Fig. 7) to provide a honeycomb structure. The corrugated strips may be more or less inherently flexible, if desired, as they are reenforced by the flat strips. The screen structure is disposed edgewise, that is, with the strips edgewise and recesses vertically directed. The purpose of having the screen rigid is so that it will not bend but will provide for good contact with the top of the article to be dried.

The screen and the table are connected by wires 60 and 61 to a low voltage circuit, such as shown in Fig. 2, so that there will be a circuit of low voltage over the whole area and through the article to be dried. In this embodiment, the article is heated throughout its entire area, as in Fig. 4, by reason of the metal table support and the screen rather than being progressively heated as in Figs. 1 and 5. The greatest amount of water will be present at the opposite surfaces of the article where the portions of the screen, between the meshes, are in contact with the opposite surfaces of the article. The weight of the screen upon the article will prevent the article from shrinking.

It will be seen from the foregoing description of the various embodiments that the articles are uniformly dried electrically, there being a low voltage circuit transversely with water contained in and upon the surface of the article insuring a good circuit. A high voltage circuit may be also disposed lengthwise of the article. The water contained in the article is driven out by the electrical heating. Contact of the rolls or screen with the article in the low voltage circuit is assured by the water forced out of the said articles.

I am aware there may be various changes in details of construction without departing from the spirit of my invention, and, therefore, I claim my invention broadly as indicated by the appended claims.

Having thus described my invention, what I claim is new and useful and desire to secure by U. S. Letters Patent is:

1. The method of heat drying wet porous sheet material comprising impressing low voltages transversely of the sheet material from its opposite surfaces for causing electric heating currents to flow through said sheet, and simultaneously impressing higher voltages longitudinally of the sheet material to cause additional electric current to flow through said sheet material.

2. The method of claim 1 in which the sheet material is spread while being heat dried.

3. The method of claim 1 in which the sheet material is spread transversely and longitudinally while being heat dried.

4. The method of claim 1 in which the sheet material is moved while being impressed with the lower and higher voltages.

5. The method of heat drying wet porous sheet material comprising impressing low voltages through the sheet material from its opposite surfaces along transversely extended lines which are spaced apart longitudinally of the sheet material for causing electric heating currents to flow through said sheet material, and simultaneously impressing higher voltages from line to line along the sheet material to cause additional current to flow through said sheet material.

6. Apparatus for heat drying wet porous sheet material comprising a plurality of pairs of electrodes spaced aptrt longitudinally in transversely disposed relation to the sheet material adapted to be fed through said electrode pairs and nipped between each pair, means for impressing a low voltage between the electrodes of each pair to cause electric current to flow therebetween through the sheet material, and means for impressing higher voltage between the pairs to cause electric heating current to flow through the sheet material from pair to pair.

7. The apparatus of claim 6, including means for spreading the sheet material.

8. The apparatus of claim 6, including means for spreading the sheet material transversely and longitudinally.

9. The apparatus of claim 6 in which some of the electrodes are rotatable.

10. An apparatus for electrically drying wet fibrous material comprising a nip roll pair of squeezing means between which the wet fibrous material is fed, an electrical circuit connected to the squeezing means, and a supply of liquid squeezed out of the wet fibrous material to the opposite surfaces thereof into contact with the squeezing means at the nip of the roll pair where the material is squeezed for closing the electrical circuit through the fibrous material.

11. The method of electrically drying wet fibrous material comprising forming with a pair of nip rolls an electrical circuit with terminals disposed adjacent opposite sides of said fibrous material, and squeezing liquid out of the fibrous material to the nip portion between said nip pair to its opposite surfaces into contact with said electrical terminals for closing the electrical circuit between the terminals through said fibrous material.

References Cited in the file of this patent

UNITED STATES PATENTS

| | | |
|---|---|---|
| 426,970 | Stiner et al. | Apr. 29, 1890 |
| 654,487 | Ashworth | July 31, 1900 |
| 1,626,766 | Tompkins | May 3, 1927 |
| 1,726,678 | Osthoff | Sept. 3, 1929 |
| 2,324,068 | Crandell | July 13, 1943 |
| 2,559,713 | Dunski | July 10, 1951 |
| 2,684,319 | Arnold | July 20, 1954 |